(12) United States Patent
Warries et al.

(10) Patent No.: US 9,701,473 B2
(45) Date of Patent: Jul. 11, 2017

(54) SYSTEM FOR STORING PRODUCTS, METHOD FOR USING SUCH A SYSTEM AS WELL AS A CENTRAL CONTROL UNIT ARRANGED TO BE OPERATIVE IN SUCH A SYSTEM

(71) Applicant: VANDERLANDE INDUSTRIES B.V., Veghel (NL)

(72) Inventors: Marcel Renee Warries, Nieuwegein (NL); Bruno Van Wijngaarden, Son En Breugel (NL); Franciscus Maria Van Den Berk, Son En Breugel (NL)

(73) Assignee: VANDERLANDE INDUSTRIES B.V., Veghel (NL)

( * ) Notice: Subject to any disclaimer, the term of this patent is extended or adjusted under 35 U.S.C. 154(b) by 0 days.

(21) Appl. No.: 15/119,614

(22) PCT Filed: Feb. 17, 2015

(86) PCT No.: PCT/NL2015/050100
§ 371 (c)(1),
(2) Date: Aug. 17, 2016

(87) PCT Pub. No.: WO2015/126242
PCT Pub. Date: Aug. 27, 2015

(65) Prior Publication Data
US 2017/0057744 A1    Mar. 2, 2017

(30) Foreign Application Priority Data
Feb. 21, 2014    (NL) ...................................... 2012299

(51) Int. Cl.
*G06F 7/00*     (2006.01)
*B65G 1/04*     (2006.01)
(Continued)

(52) U.S. Cl.
CPC ......... *B65G 1/0492* (2013.01); *B65G 1/1373* (2013.01); *F16P 3/14* (2013.01); *B65G 2207/40* (2013.01)

(58) Field of Classification Search
None
See application file for complete search history.

(56) References Cited

U.S. PATENT DOCUMENTS 3,455,468 A * 7/1969 Sanford ............... B65G 1/0421
                                                   414/275
3,528,566 A * 9/1970 Weir .................... B65G 1/1378
                                                   187/244

(Continued)

FOREIGN PATENT DOCUMENTS

DE    10 2011 117487    12/2012
WO    WO 2012/083055    6/2012

OTHER PUBLICATIONS

Search Report and Written Opinion issued in Int'l App. No. PCT/NL2015/050100 (2015).

*Primary Examiner* — Yolanda Cumbess
(74) *Attorney, Agent, or Firm* — Barnes & Thornburg LLP; Mark J. Nahnsen (57) ABSTRACT

System for storing products, comprising a number of racks extending parallel to each other, wherein each rack is provided with storage positions for products located next to and above each other, a guide system comprising longitudinal guides extending in aisles between adjacent racks, and horizontal transverse guides extending transversely to the longitudinal guides as well as junctions at positions where at least one longitudinal guide and at least one transverse guide connect, carriages capable of autonomously travelling over the longitudinal guides, transverse guides and junctions for placing products in and/or taking products out the storage positions, and a central control unit arranged for digitally (Continued)

locking of longitudinal guides identified with an identification means and for controlling the autonomous carriages solely over the unlocked longitudinal guides.

15 Claims, 7 Drawing Sheets

(51) Int. Cl.
*F16P 3/14* (2006.01)
*B65G 1/137* (2006.01)

(56) References Cited

U.S. PATENT DOCUMENTS

| | | | | |
|---|---|---|---|---|
| 5,407,316 A | * | 4/1995 | Coatta | B65G 63/004 414/277 |
| 6,042,321 A | * | 3/2000 | Labell | B65G 1/0414 414/276 |
| 2014/0301810 A1 | | 10/2014 | Steinbach | |

* cited by examiner

SYSTEM FOR STORING PRODUCTS, METHOD FOR USING SUCH A SYSTEM AS WELL AS A CENTRAL CONTROL UNIT ARRANGED TO BE OPERATIVE IN SUCH A SYSTEM

CROSS REFERENCE TO RELATED APPLICATIONS

This application is a U.S. nationalization under 35 U.S.C. §371 of International Application No. PCT/NL2015/050100, filed Feb. 17, 2015, which claims priority to Netherlands Patent Application No. 2012299, filed Feb. 21, 2014. The disclosures set forth in the referenced applications are incorporated herein by reference in their entireties.

The present invention relates to a system for storing products, comprising:
- a number of racks extending parallel to each other, wherein each rack is provided with storage positions for products located next to and above each other;
- a guide system comprising longitudinal guides extending in aisles between adjacent racks, and horizontal transverse guides extending transversely to the longitudinal guides as well as junctions at positions where at least one longitudinal guide and at least one transverse guide connect;
- carriages capable of autonomously travelling over the longitudinal guides, transverse guides and junctions for placing products in and/or taking products out of the storage positions;
- a central control unit arranged for digitally releasing and locking longitudinal guides and for controlling the autonomous carriages solely over the released longitudinal guides.

The present invention further relates to a method for controlling autonomous carriages in such a system for storing products.

The present invention also relates to a central control unit arranged to operate in a system for storing products according to the invention.

Such systems are, among other, used in warehouses where products are stored in product containers and wherein the product containers are stored in the racks of the storage system. Such warehouses are used, for example, in automated order picking systems.

Junctions are formed by crossings where two aligned parts of a longitudinal guide and two aligned parts of a transverse guide converge, by T-junctions where either two aligned parts of a longitudinal guide and a transverse guide or a longitudinal guide and two aligned parts of a transverse guide converge, or, for example, by right-angled connections between a longitudinal guide and a transverse guide at the location of corners of the storage system.

U.S. Pat. No. 7,591,630 discloses a storage system wherein products are stored in containers such as bins in racks arranged in parallel. Autonomously operating carriages are able to travel through the storage system in aisles between the racks. For this purpose, the carriages are each provided with their own drive system including a battery, and are able, controlled by a central control unit based on wirelessly communicated commands, to autonomously store a container having one or more products in a desired storage position, or to retrieve the container from a storage position and transport the container to a collection site. The carriages are able to travel from one aisle to another aisle, and are able to travel from one level to another level.

An individual, like a maintenance engineer, needs to localise and approach a carriage in case that carriage suddenly stops in the storage system. The storage system according to U.S. Pat. No. 7,591,630 comprises platforms so that the carriage can be approached. The carriages are able to travel over the platforms on each level. These platforms are made in such a way that they can be folded away. This enables a platform to be folded away positioned one or a plurality of levels above the carriage, in downwards direction, in such a way that a maintenance engineer is able to reach the carriage, and is able to, from the topside thereof, perform maintenance or repair the carriage. This is an elaborate and complex process in which, moreover, the carriage is merely reachable for the maintenance engineer to a certain extent.

Furthermore, the maintenance engineer needs to be able to perform repairs and/or maintenance to, for example, the racks, the product containers, or the products in the product containers, transverse guides and/or longitudinal guides.

The object of the present invention is to provide a system for storage of products, wherein an individual, like a maintenance engineer, is able to simply and safely perform maintenance and/or repairs and such to carriages as well as racks and guides present in the system, and with the least possible adverse effect on the efficiency of the system.

The stated object is achieved with the system according to the present invention, in a first aspect thereof, wherein the system further comprises:
- a number of vertically located work areas per aisle, wherein each work area comprises a number of height levels, wherein each height level includes horizontally disposed longitudinal guides and is associated with one horizontal layer of storage positions for the products located next to each other;
- identification means, near end phases of the racks, present at the work areas, for uniquely identifying the longitudinal guides of each work area;
- at least one portable wireless reading device in communication with the central control unit for reading out the identification means and for communicating read out identification means to the central control unit, wherein the central control unit is further arranged for digitally locking longitudinal guides identified with an identification means, communicated by a portable wireless reading device.

An advantage of the system for storing products according to the present invention is that an individual, like a maintenance engineer, is able to simply lock a work area, in such a way that the autonomous carriages will not use and/or are not able to use guides present in the locked work area, and wherein carriages present in the work area, at the moment of locking, will either leave or will be stopped in the aisle/work area. As a result, the work area is made available for the individual, so that the individual can safely enter the work area.

The individual, for example the maintenance engineer, merely needs to read out an identification means present close to the end phases of a rack of the work area and/or aisle with a portable wireless reading device, after which the system will perform the required actions to make sure that the autonomous carriages will not enter the corresponding work area.

Digitally locking a work area, according to the present invention, means that the longitudinal guides corresponding to that work area are being digitally locked. The central control unit is arranged for controlling the autonomous carriages solely over the digitally released longitudinal guides, such that the autonomous carriages will not travel through the work areas corresponding to digitally locked longitudinal guides.

Another advantage of the present invention is directed to the deployment and scalability of the system. In practice, autonomous carriages are often deployed for the larger warehouses, i.e. warehouses having many racks extending parallel to each other. The inventors have recognised that the scalability of the system improves when a portable wireless reading device is used in combination with simple, cheap identification means for uniquely identifying longitudinal guides associated with the work areas of the many racks. In such a manner, for example no expensive cables, electronic circuits and the like are required per work area or aisle, to identify the longitudinal guides of the work areas. Just one unique, simple, identification means per work area to be identified is required to identify longitudinal guides of that work area, wherein the intelligence is comprised in the portable wireless reading device. The identification means just need to, for example, comprise a passive, but unique string.

The racks are vertically divided in various height levels, wherein each height level corresponds to one horizontal layer of storage positions for the products located next to each other. In addition, each height level is provided with longitudinal guides for guiding the carriages along the storage positions located next to each other. The system further comprises elevators, for example located close to the end phases of the racks, arranged for transporting the autonomous carriages between the various height levels.

Within the system, work areas are defined, wherein each work area comprises a plurality of height levels of an aisle. The work area typically comprises 7 to 8 height levels, so that an individual, like a maintenance engineer, is able to stand up in the work area to perform the work. These work areas are mutually insulated from each other by means of, for example, a walking floor, which is attached to the racks.

The advantage of this is that, by dividing an aisle in a number of vertical work areas, it is not necessary to digitally lock a complete aisle, in case an individual, like a maintenance engineer, needs to be present in a certain work area of that aisle. In such a case, only that particular work area is digitally locked for the autonomous carriages. That is to say, all longitudinal guides corresponding to the different vertical levels of that work area are being digitally locked. Work areas on top of, below or next to that work area remain operational; these will not be digitally locked by the abovementioned method.

At least one portable wireless reading device is, in an example, arranged to communicate with the central control unit via a Wireless Local Area Network "Wifi" connection or a Bluetooth connection.

Preferably, the central control unit is further arranged for:
digitally releasing longitudinal guides identified with the identification means, communicated by the portable wireless reading device, at least under the condition that the central control unit had previously locked the longitudinal guides for the same portable wireless reading device.

In practical situations, every portable wireless reading device is coupled with a single individual, for example one operator or one maintenance engineer. Because longitudinal guides are being digitally released under the condition that the central control unit had previously locked these longitudinal guides for the same portable wireless reading device, it is possible to make one individual responsible for a locked work area, i.e. longitudinal guides in a locked work area.

The inventors have recognised that, in practice, it will occur that multiple individuals will perform maintenance and/or repairs simultaneously in a warehouse. When an individual has locked a certain work area, that individual is made responsible for that work area. When another individual, having another reading device, reads out identification means of the work area which had already been locked, the responsibility for that locked work area will, in an example, not be transferred to that other individual. The individual that controls the reading device with which the work area initially was locked, is responsible for that work area until the same individual having the same reading device again reads the same identification means, resulting therein that the work area is being digitally released.

In an example, the central control unit is arranged to communicate an error message to the other individual, i.e. to the reading device of that other individual. This reading device may then, for example, indicate to that other individual that the work area had already been locked by an individual, and may further indicate who had locked that particular work area.

It may be useful in case the system comprises further identification means, close to end phases of the racks, present at the work areas, for uniquely identifying longitudinal guides of each work area, wherein the central control unit is further arranged for:
digitally register whether an individual is present or not in a work area associated with longitudinal guides, wherein the longitudinal guides are identified with further identification means, communicated by a further portable wireless reading device, and
digitally releasing the longitudinal guides identified with identification means communicated by the portable wireless reading device at least under the condition that no presence of an individual is registered in the work area identified with the identification means.

The abovementioned embodiment is a further detailed example of the concept that each reading device is coupled with a single individual.

In the context of the present invention, identification means and, if appropriate, further identification means are placed close to the end phases of the racks, near the work areas. The goal of the identification means is to assign responsibility to individuals and the goal of the further identification means is to register further individuals in work areas.

The advantage of this embodiment is that longitudinal guides of a work area may be digitally released when no other individuals, at that time, are registered in the work area. It is the responsibility of the individual who, initially, made sure that the longitudinal guides of the work area are digitally locked, to ensure that any registered further individuals leave the same work area. This simplifies the administration policy of the system at least in the field of liability and/or responsibility.

Furthermore, it may be advantageous if the system further comprises:
closing devices, placed close to each work area, for physically closing and opening these aisles or work areas for individuals, wherein a closing device of a work area in open position covers the identification means associated with that work area for the at least one portable wireless reading device.

In such a way, the responsible individual for a certain work area is also being safeguarded. Here, it is important that the individual, after the individual with his/her reading device has read the identification means of a certain work area and thus has locked that work area, physically transfers the closing device of that work area to an open position, such that the identification means for that work area are being covered. Thus, it is not possible that, unless by mistake, another individual with a further reading device tries to read out the same identification means. These identification means are covered by the closing device. Such a closing device may be a barrier, which, in a closed position, indicates that the corresponding work area is being digitally released, and which, in an open position, indicates that the corresponding work area is digitally locked.

Preferably, the closing devices of the work areas also cover, in closed position, further identification means of those work areas for the at least one portable wireless reading device.

This has the advantage that it is not possible to read out the further identification means with a portable wireless reading device, when the longitudinal guides corresponding with the work area are not being digitally locked. As a result, it is only possible to register further individuals in a work area, when the longitudinal guides of that work area are already digitally locked by a responsible individual.

Preferably, the identification means comprise at least one of: QR codes, bar codes and RFID identification. Such identification means are cheap and easy to fabricate, as a result of which the scalability of the system improves. For an administrator of a system according to the present invention it is relatively easy to create additional, unique QR codes, for example, when additional racks are being placed in the warehouse.

In an example, the portable wireless reading devices comprise at least one of a bar code reader, a mobile phone, a tablet, an RFID reader wherein the mobile telephone, for example, comprises a camera for reading out an QR code.

In a further example, the central control unit is further arranged for digitally locking longitudinal guides present in a work area extending from longitudinal guides identified with the communicated identification means.

Here, the racks are not only placed parallel to each other, but also one after another, such that the aisles between the racks positioned parallel to each other also extend between the aisles positioned after one each other. In case a certain work area needs to be digitally locked, the central control unit will also lock the work area which located right thereafter.

In a second aspect, the invention provides for controlling autonomous carriages in a system for storing products, wherein the system comprises:
  a plurality of racks extending parallel to each other, wherein each rack is provided with storage positions for products located next to and above each other;
  a guide system comprising longitudinal guides extending in aisles between adjacent racks, and horizontal transverse guides extending transversely to the longitudinal guides as well as junctions at positions where at least one longitudinal guide and at least one transverse guide connect;
  carriages capable of autonomously travelling over the longitudinal guides, transverse guides and junctions for placing products in and/or taking products out the storage positions;
  multiple vertically located work areas per aisle, wherein each work area comprises a number of height levels, wherein each height level includes horizontally disposed longitudinal guides and is associated with one horizontal layer of storage positions for the products located next to each other;
  identification means, near end phases of the racks, present at the work areas, for uniquely identifying the longitudinal guides of each work area;
  at least one portable wireless reading device in communication with the central control unit for reading out the identification means and for communicating read out identification means to the central control unit,
said method being characterized by the steps of:
  receiving, by the central control unit, from a portable wireless reading device, data representative longitudinal guides corresponding to a read out identification means by the portable wireless reading device;
  digitally locking, by the central control unit, the longitudinal guides based on the received data;
  controlling the autonomous carriages solely over the released longitudinal guides.

The communication between the portable wireless reading device and the central control unit may, according to the present invention, take place in several different ways. In an example, the unique identification means are being communicated to the central control unit by the reading device. The central control unit is then responsible to translate these unique identification means to longitudinal guides of a work area corresponding to the communicated unique identification means. In another example, the translation can also be performed by the portable wireless reading device itself, wherein the reading device is arranged to communicate the identification of the longitudinal guides corresponding to the read out identification means to the central control unit.

Different aspects applicable to the embodiments of the methods according to the present invention, including the advantages thereof, correspond to the aspects applicable to the system according to the invention as described before.

In an example of the method, the step of receiving data representative for longitudinal guides corresponding to identification means read out by a portable wireless reading device comprises the steps of:
  reading out, by the portable wireless reading device, identification means and
  communicating, by the portable wireless reading device of data representative for longitudinal guides corresponding to identification means read out by the portable wireless reading device, such as the identification means itself, or data representative for the longitudinal guides corresponding to the read out identification means.

Preferably, the method further comprises the step of:
  digitally releasing locked longitudinal guides associated with identification means communicated by a portable wireless reading device at least under the condition that the central control unit had previously locked the longitudinal guides for the same portable wireless reading device.

In a preferred embodiment the system comprises further identification means, close to end phases of the racks, present at the work areas and/or aisles, for uniquely identifying longitudinal guides of each work area, which method further comprises the steps of:
  receiving, by the central control unit, from a portable wireless reading device, data representative longitudinal guides associated with a read out further identification means by a further portable wireless reading device;
  digitally registering the presence of individuals in the work area;
  digitally releasing of locked longitudinal guides identified by an identification means communicated by a portable wireless reading device at least under the condition that no presence of an individual is registered in the work area identified with the identification means.

The above is applicable in the example where every aisle has a plurality of vertically located work areas, wherein each work area comprises a plurality of height levels, wherein each height level comprises horizontally oriented longitudinal guides and corresponds to one horizontal layer of product positions for the products placed next to each other, wherein the further identification means identify transverse guides f different work areas of an aisle. The step of digitally releasing then further comprises digitally releasing locked longitudinal guides corresponding to, i.e. identified with identification means communicates by a portable wireless reading device, at least under the condition that no presence of a further individual in the corresponding work area is registered.

Preferably, the step of digitally locking, by the central control unit, longitudinal guides based on the received data, comprises:
controlling, by the central control unit, autonomous carriages out of the locked longitudinal guides.

The central control unit is not only arranged to control the autonomous carriages solely over the digitally released longitudinal guides, but is also arranged to control autonomous carriages from the locked longitudinal guides, for example when a maintenance engineer wants to lock an aisle or work area by reading out corresponding identification means.

As an alternative, the step of digitally locking, by the central control unit, longitudinal guides based on the received data, comprises:
stopping, by the central control unit, the autonomous carriages on the locked longitudinal guides.

These autonomous carriages will stand still in an aisle or work area which is locked, during the locked period, in such a way that it will not cause any inconvenience to an individual, for example during maintenance work in an aisle and/or work area.

In a third aspect, the invention provides for a central control unit arranged to be operative in a system according to any of the embodiments, characterized in, that the central control unit comprises:
receiving means arranged for receiving, from a portable wireless reading device, data representative for longitudinal guides from a read out identification means by a portable wireless reading device;
locking means arranged for digitally locking the longitudinal guides based on the received data;
control means arranged for controlling the autonomous carriages over released longitudinal guides.

Different aspects which are applicable for the embodiments of the central control unit according to the present invention, including the advantages thereof correspond to the aspects which are applicable to the system and/or the method according to the invention as described before.

Preferably, the central control unit further comprises:
a memory for storing an identification of a portable wireless reading device for which longitudinal guides are being locked,
and wherein the locking means are arranged for digitally releasing the locked longitudinal guides when, in the memory, the same identification of the portable wireless reading device is stored related to the previous act of locking the longitudinal guides, i.e. that the same identification is stored in the memory for bringing the longitudinal guides to a locked state.

In a further embodiment the control means are arranged for one of:
controlling, by the central control unit, autonomous carriages to leave the locked longitudinal guides, and
stopping, by the central control unit, autonomous carriages on the locked longitudinal guides.

In the context of the present invention a module, device, apparatus, equipment or the like may also be implemented as a computer programme running on a control unit, processor.

The nomenclature of the various aspects of the system, the method and the central control unit according to the present invention should not be interpreted literally. The chosen naming is merely applied to express the underlying idea behind the aspect.

The invention will now be explained in more detail in accordance with the enclosed figures, which figures merely illustrate the invention and may not be explained as a limitation hereof.

Figure 1:
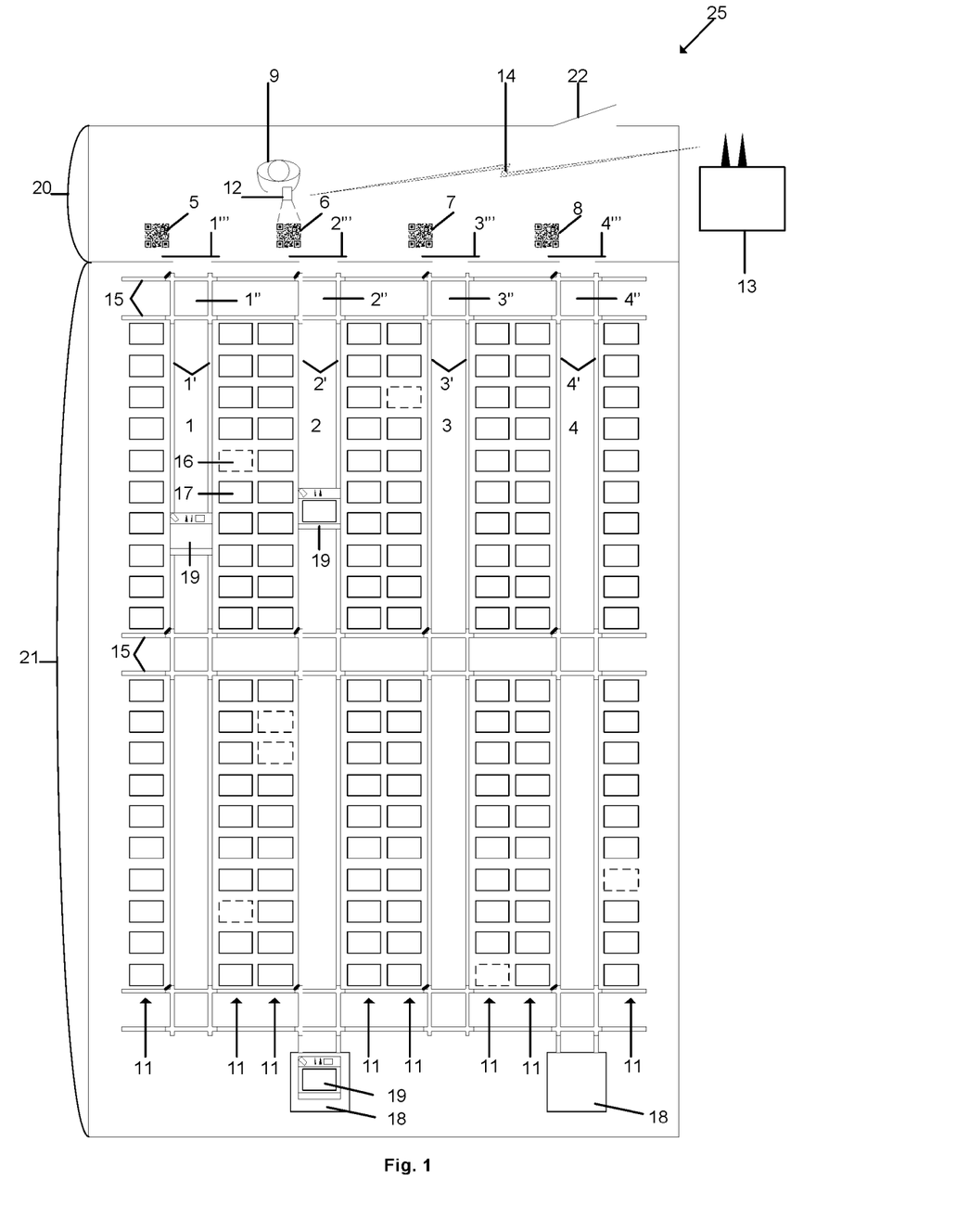
FIG. 1 is a schematic top plan view of a part of a system according to the invention.

The system 25 for storing products comprises a number of racks 11 which extend parallel to each other, wherein each rack 11 is provided with storage positions 16 positioned above each other. The storage positions 16 are arranged for storing product bins 17. Each product bin 17 is filled with a product or a number of products, or is empty and suitable to be filled with one or a number of products.

Between the racks 11 aisles 1, 2, 3, 4 are being formed, i.e. the spaces between the racks 11 are defined as aisles. The system further comprises a guide system. This guide system comprises, among other things, longitudinal guides 1', 2', 3', 4', which extend in the aisles 1, 2, 3, 4, and horizontally transverse to the longitudinal guides 1', 2', 3', 4', extending transverse guides 15, and junctions 1", 2", 3", 4" at positions where the longitudinal guides 1', 2', 3', 4' and the transverse guides 15 cross each other. These junctions may comprise T-junctions as well as complete junctions. T-junctions are being formed close to the end phases of the racks and the junctions are being formed by transverse aisles located transversely to the aisles 1, 2, 3, 4 which run through the racks 11, i.e. in spaces between racks 11 which are positioned after each other.

The system 25 for storing products further comprises autonomous carriages 19 that are capable of autonomously travelling over the guiding system. This means that the autonomous carriages 19 are able to travel over the longitudinal guides 1', 2', 3', 4', transverse guides 15 and junctions 1", 2", 3", 4" for either placing the product bins 16 in the storage positions 16 and/or taking the product bins out from the storage positions 17.

In this specific example, the autonomous carriages 19 comprise two sets of wheels which are each adjustable in height compared to each other, and are oriented transversely to each other. The first set of wheels are used to travel to autonomous carriages 19 over the longitudinal guides 1', 2', 3', 4', while, after switching from the first set of wheels to the other set of wheels, which in actual practice happens at for example one of the junctions 1", 2", 3", 4" the autonomous carriages 19 are able to travel over the transverse guides 15. Moreover, the orientation of the autonomous carriages 19 at the junctions 1", 2", 3", 4" does not have to change.

To be able to travel autonomously, each carriage 19 has its own drive unit and its own energy supply, such as an electro motor and an electrical battery. The carriages 19 are arranged to move products and/or product bins 17 within the system 25 for storing the products, and to that end comprise exchange means by means of which a product bin 17 can be transferred to a storage position 16, or by means of which a product bin 17 can be taken from a storage location 16.

The exchange means may in practice be embodied as extended support arms, for example, which are slightly adjustable for height in relation to a storage position 16.

FIG. 1 only shows a part of a system 25 for storing products, wherein only four aisles are being displayed. In practical warehouses many more racks, and thus also aisles, will be present. The system 25 for storing products in the present example is provided with a plurality of vertically positioned work areas in each aisle, wherein each work area comprises a number of height levels. To this end, each height level comprises horizontally positioned longitudinal guides and each height level corresponds to one horizontal layer of storage positions for the products positioned next to each other. As such, an autonomous carriage 19 is able to move along the product containers 17 at each level.

A work area is in the present situation defined as a set of a number of height levels, wherein the number of height levels is chosen so that the work area is simply accessible to an individual, such as a maintenance engineer. The work area is further provided, for example, with a walking floor over which the individual is able to travel. In practice, a work area will comprise about 5 to 8 height levels.

At or close to a number of junctions, elevators 18 may be provided with which the autonomous carriages 19, carrying or not carrying a product bin 17, are able to be transported in vertical direction between the different height levels of the system 25. Using these elevators 18, the product bins 17 are able, for example, to be supplied to a collecting station where order picking occurs and wherein products from product bins 17 in a collecting bin are being collected.

The system further comprises a central control unit 13 arranged for digitally releasing and locking longitudinal guides 1', 2', 3', 4' and for controlling the autonomous carriages 19 solely over the released longitudinal guides 1', 2', 3', 4'.

The autonomous carriages 19 are being autonomous in such a way that they are able to travel over the longitudinal guides 1', 2', 3', 4', transverse guides 15 and the junctions 1", 2", 3", 4". However, these autonomous carriages 19 are at least for a part controlled by a central control unit 13, which control unit 13 is able to set forth additional limitations to the longitudinal guides 1', 2', 3', 4' available for the autonomous carriages. These additional limitations are, for example, aimed at longitudinal guides that are digitally locked, as a result of which the autonomous carriages 19 are not allowed to use these longitudinal guides.

In an example, the central control unit 13 is arranged for determining a route over the guide system for an autonomous carriage 19 which route is being communicated wirelessly to the autonomous carriage 19, and wherein the autonomous carriage 19 is arranged for tracking the route. The central control unit 13 is also arranged to determine the route over solely the digitally released longitudinal guides. In case longitudinal guides are characterised as being digitally locked, the central control unit 13 will avoid these longitudinal guides during the set up of routes for the autonomous carriages 19.

In another example, or as an addition to the above mentioned, the autonomous carriages 19 are arranged to determine the routes over the route system, wherein the autonomous carriages 19 are arranged to avoid the digitally locked longitudinal guides. Here, the central control unit 13 is arranged to communicate the digitally locked longitudinal guides to the autonomous carriages 19. These communicated digitally locked longitudinal guides form additional limitations which the autonomous carriages 19 need to take into account during the set up of the routes.

The system 25 for storing products comprises a shielded area 21 and an accessible area 20, wherein the accessible area is accessible for schooled individuals 9 without them running the risk that they interfere with the system 25 in any way. The autonomous carriages 19 cannot reach this accessible area 20. The shielded area is provided with the guide system over which the autonomous carriages 19 are able to travel. The system 25 for storing products is further provided with a closing gate 22 for closing the system for other users.

The system 25 for storing products further comprises, at the end phases of the racks 11, identification means 5, 6, 7, 8, for uniquely identifying longitudinal guides 1', 2', 3', 4', of the aisles 1, 2, 3, 4 respectively. In the present example, the aisles 1, 2, 3, 4 are also work areas 1, 2, 3, 4. In addition, the system 25 comprises at least one portable wireless reading device 12 in communication with the central control unit 13, which reading device 12 is arranged for reading out the identification means 5, 6, 7, 8 and for communicating 14 of read out identification means to the central control unit 13.

This communication step 14 may, for example, include the communication of data, which data are representative of either the read out identification means, or of the aisle respectively, or of the work area respectively, or of the corresponding longitudinal guides.

An individual 9 who has the intention to, for example, carry out maintenance in a certain work area 2, shall have to lock this work area by reading out the corresponding identification means 6, wherein the portable wireless reading device 12 will communicate 14 the read out communication means to the central control unit 13. This central control unit 13 will then digitally lock the work area 2, so that the autonomous carriages 19 will not enter this work area 2. This means that the autonomous carriages 19 will avoid the longitudinal guides 2' corresponding to that work area 2.

Furthermore, in the system 25 closing devices 1''', 2''', 3''', 4''' are placed close to each work area 1, 2, 3, 4, for physically closing and opening these work areas 1, 2, 3, 4 for an individual 9, wherein closing devices 1''', 2''', 3''', 4''' in an open position cover the identification means 5, 6, 7, 8 corresponding to the work areas 1, 2, 3, 4 for the at least one portable wireless reading device 12. This aspect is made visible in FIG. 2, which will be explained here below.

Figure 2:
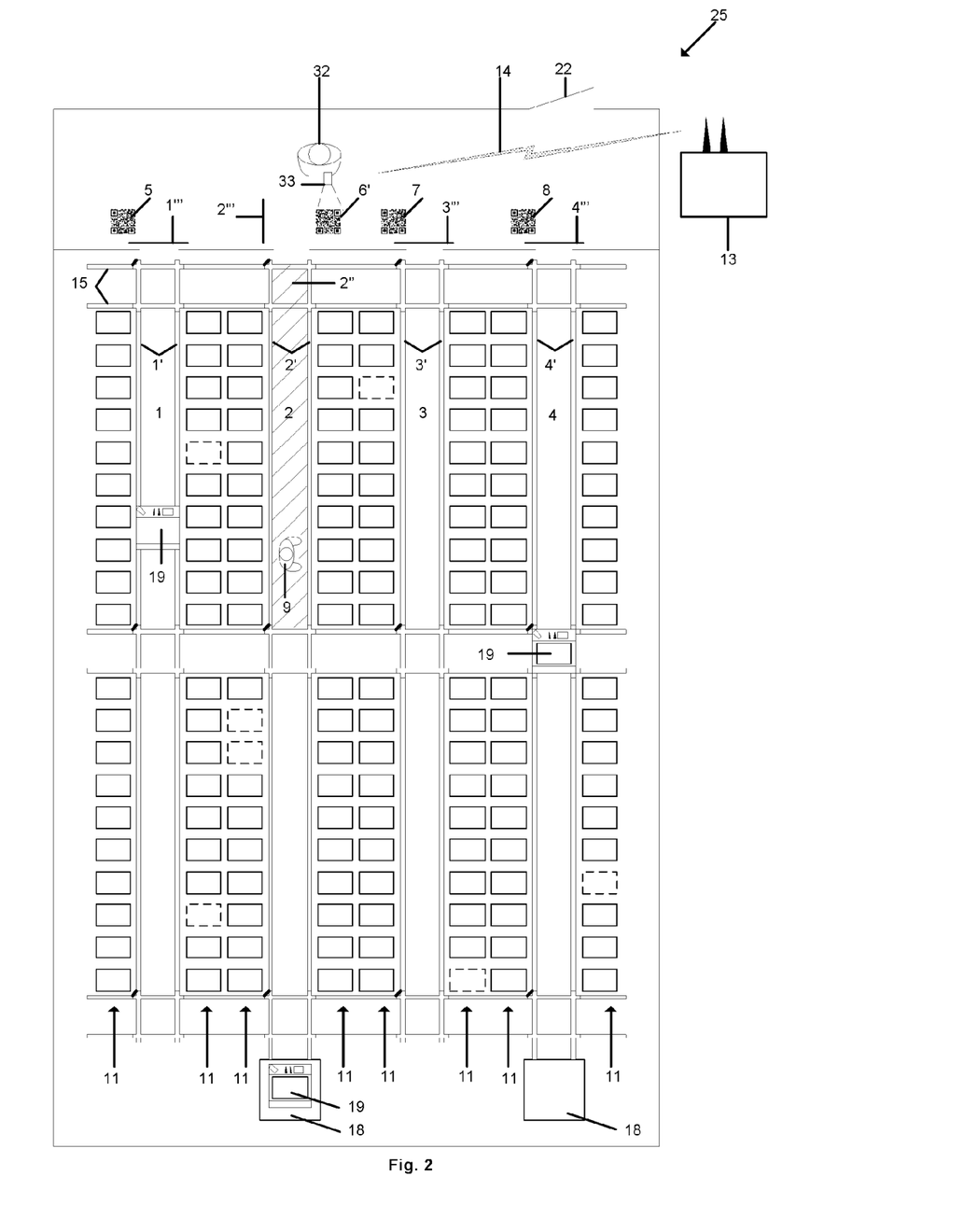
FIG. 2 is a schematic top plan view of a part of a system according to the present invention, wherein it is indicated that a work area is digitally locked and wherein an individual has entered that work area.

FIG. 2 is a situation in which the first individual 9 has digitally locked/made sure to lock the work area 2. To this end, the individual 9 has read out the identification means 6 using the portable wireless reading device 12 (not displayed in FIG. 2). Data representative for the work area 2, the longitudinal guides 2', or for the identification means 6 itself, are communicated 14 to the central control unit 13 by the reading device 12.

Based on the received data, the central control unit 13 has digitally locked the longitudinal guides 2' of the work area 2. To this end, the central control unit 13 has controlled the autonomous carriages 19 in such a way that these will not use the longitudinal guides 2', as long as these longitudinal guides 2' have the status of digitally locked. In addition, the central control unit 13 has controlled all autonomous carriages 19 present in the aisle 2, i.e. attached to the longitudinal guides 2', from the aisle 2.

In this specific example, the central control unit 13 has also digitally locked the junction 2". To this end, the central control unit 13 has digitally locked the junction 2" or the longitudinal guides 2' and the transverse guides 15 positioned at the junction 2". In such an implementation, it is ensured that the space between the closing device 2''' and the beginning of the racks 11 at the place of the work area 2 is made accessible to an individual. This implementation is a further detail of the concept according to the present invention.

After a work area 2 has been locked, a confirmation hereof is sent, by the central control unit 13, to the portable wireless reading device to indicate to the individual that the work area 2 may be entered. Such an indication for the individual 9 may, among other things comprise one of a simple green light, a text message, a schematic representation, a sound clip.

Some time may pass before all autonomous carriages 19 are removed from the locked work area 2. For safety reasons it may be decided to delay the abovementioned confirmation with a certain period of time so that it is ensured that no autonomous carriages 19 will be present in work area 2. Such a period of time is in practical situations about one minute.

The individual has transferred the closing device 2''' corresponding to the work area 2 to an open position, after which the individual 9 has received the confirmation at the portable wireless reading device 12. This has the advantage that it is made clear for all individuals that from that time onward the work area 2 is digitally locked, and thus can be entered. The individual 9 is held (administratively) responsible for managing the aisle 2. This individual 9, i.e. the portable wireless reading device 12 of that individual 9 is the only device that is capable to digitally release the work area 2.

FIG. 2 also shows that the closing device 2''', in the open position, covers the identification means 6. As a result it is not possible that a further individual 32 with his/her portable wireless reading device reads out 6 this identification means. In addition, it is shown that the further identification means 6' corresponding to the work area 2, is made visible for a further individual 32 by transferring the closing device 2''' to the open position.

This further identification means 6' is arranged for uniquely identifying longitudinal guides of the work area 2. In case a further individual 32 reads out the further identification means 6' with his/her portable wireless reading device, the data related hereto will be sent to the central control unit 13.

The intention of this further identification means 6' is to register the presence of further individuals 32 in a work area 2 corresponding to the longitudinal guides 2'. These further identification means 6' may be of the same type as the identification means 5, 6, 7, 8, but can also be of a different type. In an example, the identification means 5, 6,7, 8 comprise QR codes and the further identification means 6' comprise an RFID tag.

The central control unit 13 is arranged to keep track of whether any particular individuals are present in the digitally locked work area 2. In the present example, the central control unit 13 will register the presence of the further individual 32 via his/her reading device 33.

When the individual 9 has the intention to leave the work area 2, and thus, has to digitally release the work area 2/the longitudinal guides 2' for the autonomous carriages 19, the closing device 2" will need to be brought to its closed position again by the individual. This will allow the identification means 6 again to be made available for the individual 9, in such a way that it can be read by his/her reading device 12.

The central control unit 13 is in such a situation arranged to release the longitudinal guides corresponding to the communicated identification means 6 by the portable wireless reading device 12, provided that no presence of a further individual 32 in the work area and/or aisle 2 is registered.

The implication of abovementioned aspects is that the individual 9 is made responsible, in the first place, for the digitally locked work area 2, i.e. the digitally locked longitudinal guides 2'. Whenever the individual 9 intends to release these longitudinal guides 2', the individual 9 will have to make sure that further individuals 32 in the work area 2 have left the work area 2. These further individuals 32 will need to read out the further identification means 6' using their portable wireless reading device 33, to indicate to the central control unit 13 that they have left the work area 2. After this action has been performed, it will be made possible for the individual 9 to digitally release the longitudinal guides 2' of the work area 2.

In an example, provisions are provided in the central control unit 13 to handle any defects. It will be made possible to solve defects directed to, for example, reading devices which are lost or malfunctioning, directly in the central control unit 13. This, however, requires specific knowledge of the central control unit 13, which is in principle not available to an average individual 9. A supervisor, a manager or even a specific programmer will be able to take up these kinds of issues.

Figure 3:
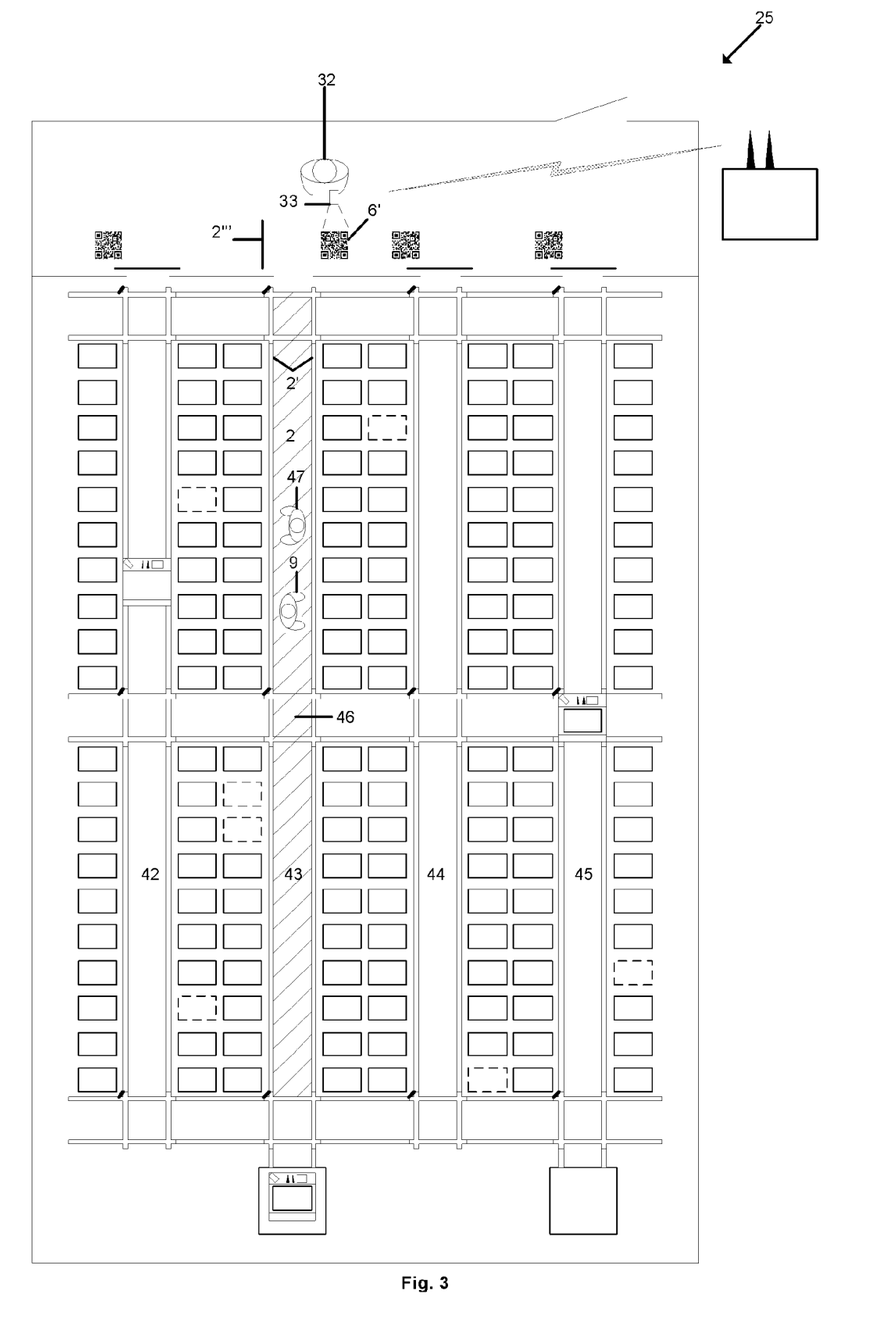
FIG. 3 is a schematic top plan view of a part of a system according to the present invention, wherein it is indicated that several work areas are digitally locked, and wherein a further individual is already registered in a work area.

FIG. 3 is a schematic top plan view of a part of a system 25 according to the present invention, wherein it is indicated that multiple work areas are digitally locked and wherein an individual is already registered in our work area.

The same reference numerals for the same aspects are used in this figure, compared to FIG. 1 and FIG. 2, to enhance the readability.

In this example it is shown that in the warehouses, in actual practice, the racks are not only positioned next to each other, but also one after the other, so that aisles and work areas 42, 43, 44, 45 are being created, and wherein transverse aisles 15 also between these racks, which are placed after each other.

In this example, it is also shown that the individual 9, using the reading device 12, by reading the identification means 6, has not only digitally locked work area 2, but also the work area that is located right thereafter, i.e. work area 43. In addition, junction 46, i.e. the longitudinal guides and transverse guides corresponding therewith, are digitally locked so that the individual 9 may cross the digitally locked aisle 2 to the digitally locked aisle 43.

In the work area 2 a further individual 47 is visible, which individual has read the further identification means 6' with his/her reading device to indicate to the system that he/she is currently present in the work area 2, or the work area 43.

Figure 4:
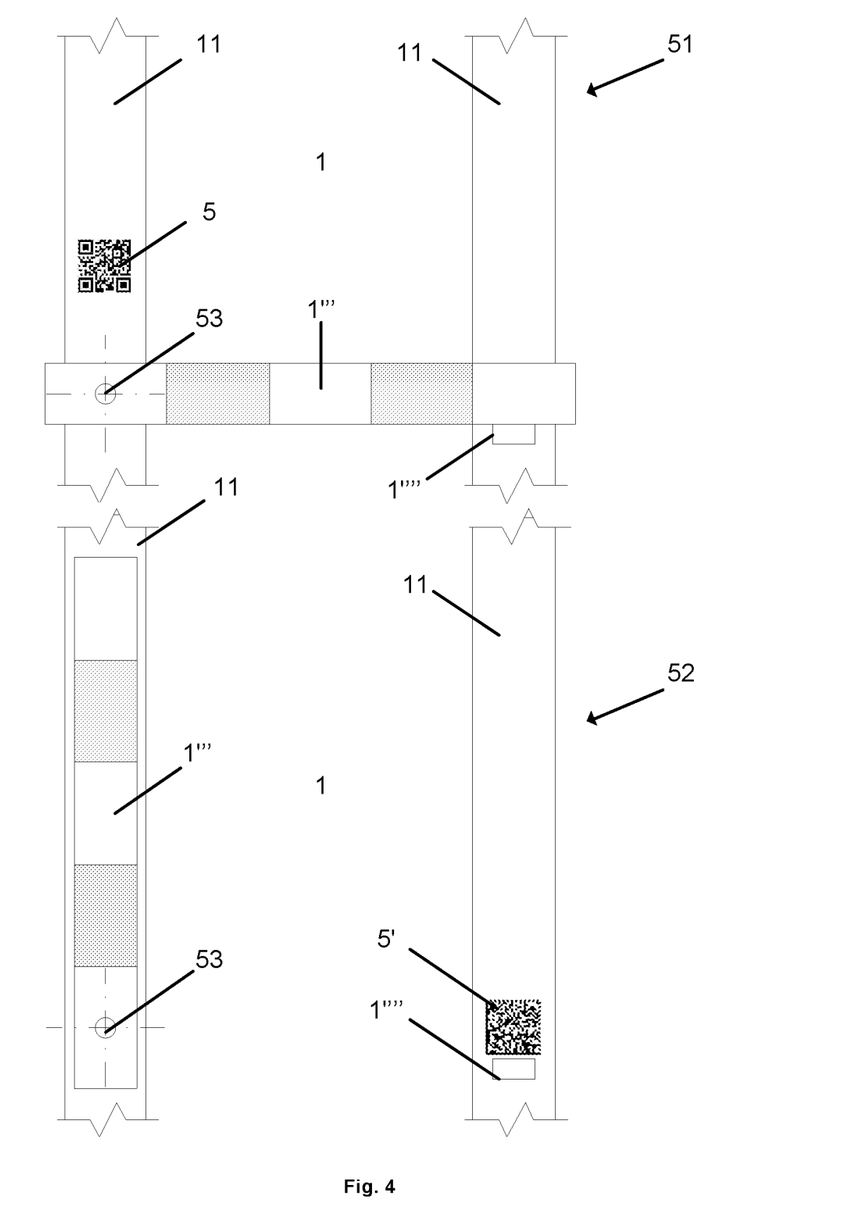
FIG. 4 is a closure device, which is displayed in a closed position and in an open position.

FIG. 4 shows an example of a closing device 1''', which is being displayed in a closed position 51 and in an open position.

In this example, it is shown that the closing device 1''', physically closes, in closed position 51, the work area entrance and/or aisle 1. This work area 1 is being formed by the spaces between the racks 11.

The closing device 1''' rests, in closed position 51, on the cam 1'''. The width of the closing device 1''' is chosen in such a way that in closed position 51 it covers the further identification means 5'. In this example, the closing device 1''' is rotatably connected to shaft 53 to the rack, with which the closing device can be rotated to the open position.

In the open position 52, the closing device 1''' covers the identification means 5 completely so that it is no longer possible for the at least one reading device to read out the identification means 5.

Figure 5:
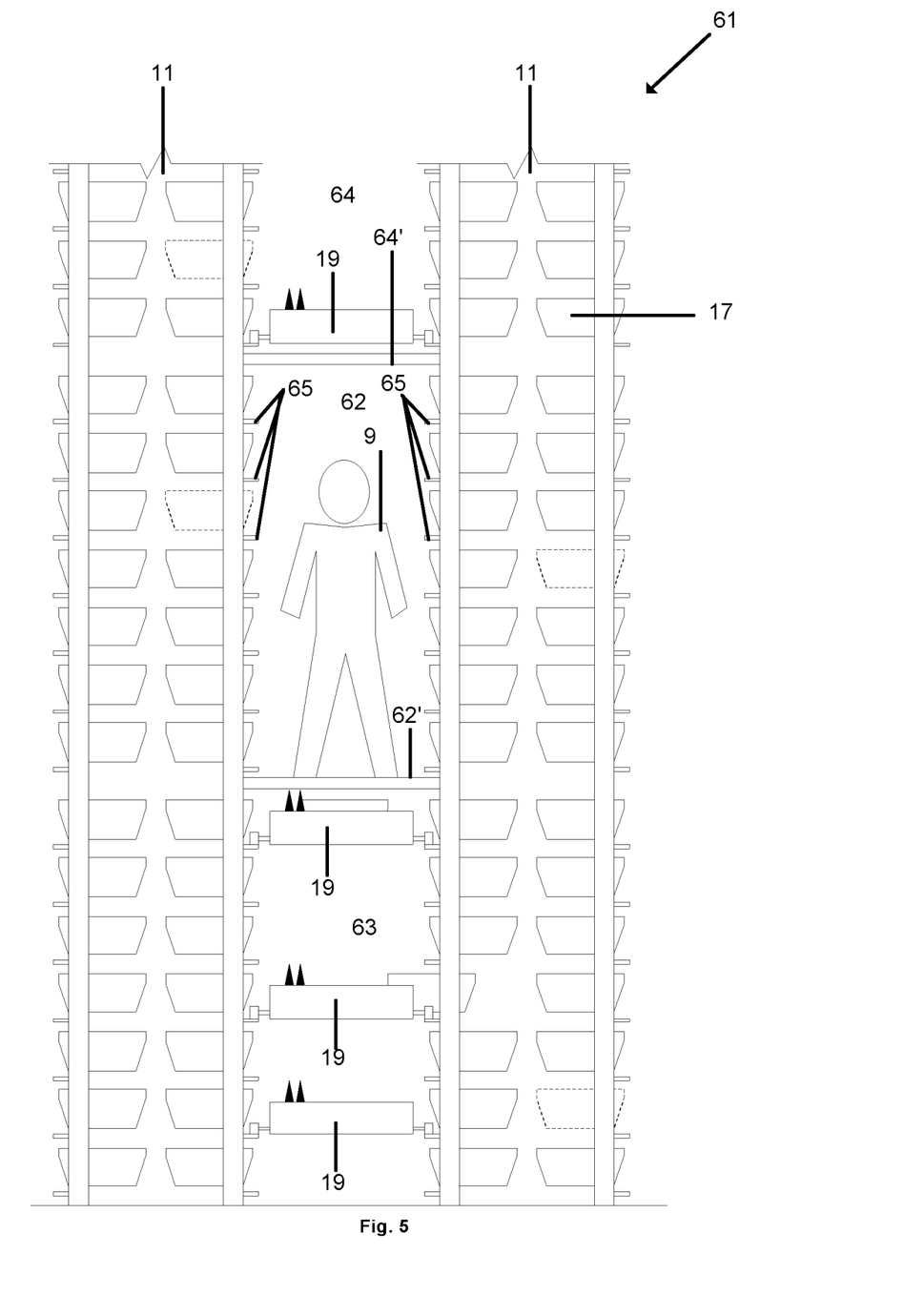
FIG. 5 is a side plan view of two racks through which an aisle is formed, wherein the aisle is divided in different work areas.

FIG. 5 is a schematic side plan view 61 of two racks 11 through which an isle is formed, wherein the aisle is divided in different work areas 62, 63, 64. The work areas 62, 63, 64 comprise seven height levels, wherein each height level comprises horizontally positioned longitudinal guides 65. It is noted that only a designated number of these longitudinal guides are referenced with reference numeral 65.

In this specific example, it is shown that work area 62 is digitally locked, as the individual 9 is present in that work area 9. The work areas 62, 64 are further provided with walkfloors 62', 64' respectively. These walkfloors 62', 64' are mounted to the racks 11 and serve to support the individuals 9.

Figure 6:
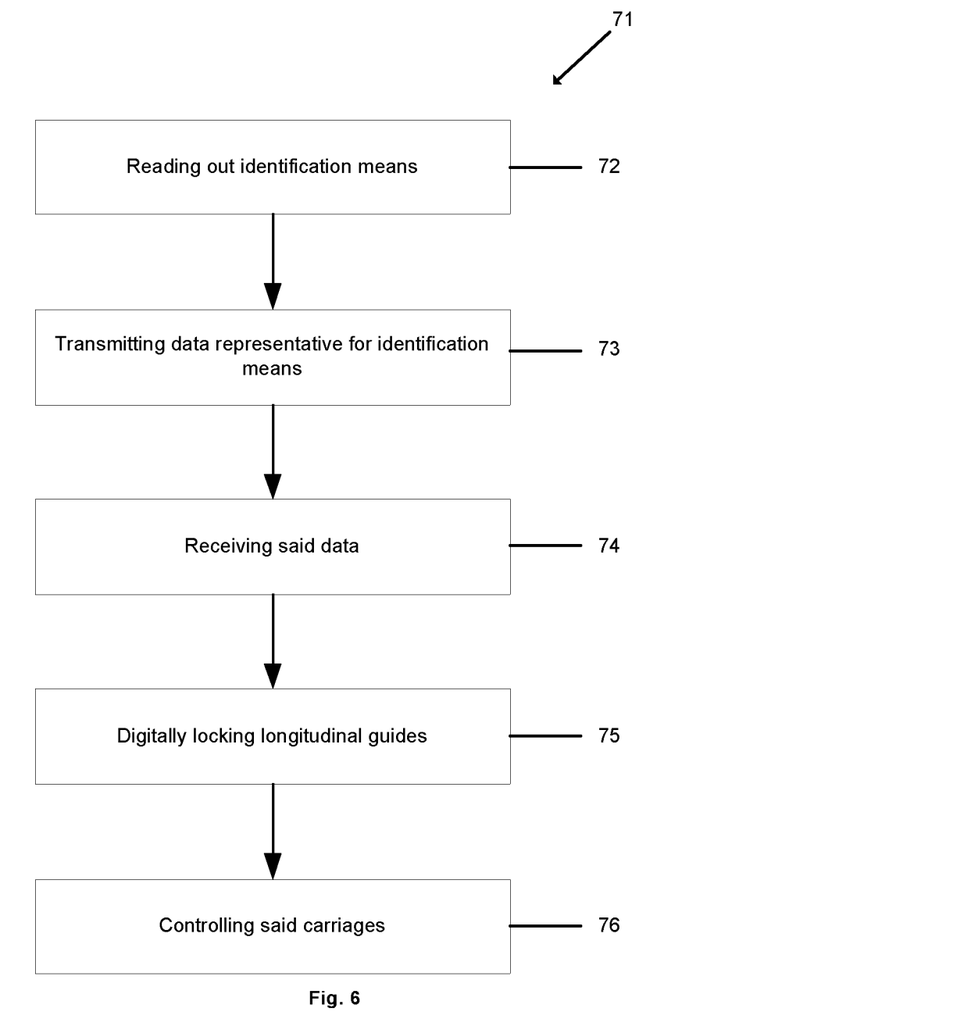
FIG. 6 is a schematic example of a method according to the present invention.

FIG. 6 is a schematic example of a method 71 according to the present invention.

The first step of the method 71 comprises reading out 72, by a portable wireless reading device, or an identification means. Subsequently, data representative of the work area, the longitudinal guides or the identification means are being wirelessly communicated 73 to the central control unit, by the portable wireless reading device.

These sent data is then subsequently received 74, by receiving means of the central control unit, and are being processed. One of the processing steps is that longitudinal guides corresponding to the communicated data are being digitally locked 75 for the autonomous carriages. Furthermore, the method comprises controlling 76 the autonomous carriages over solely digitally released longitudinal guides.

Figure 7:
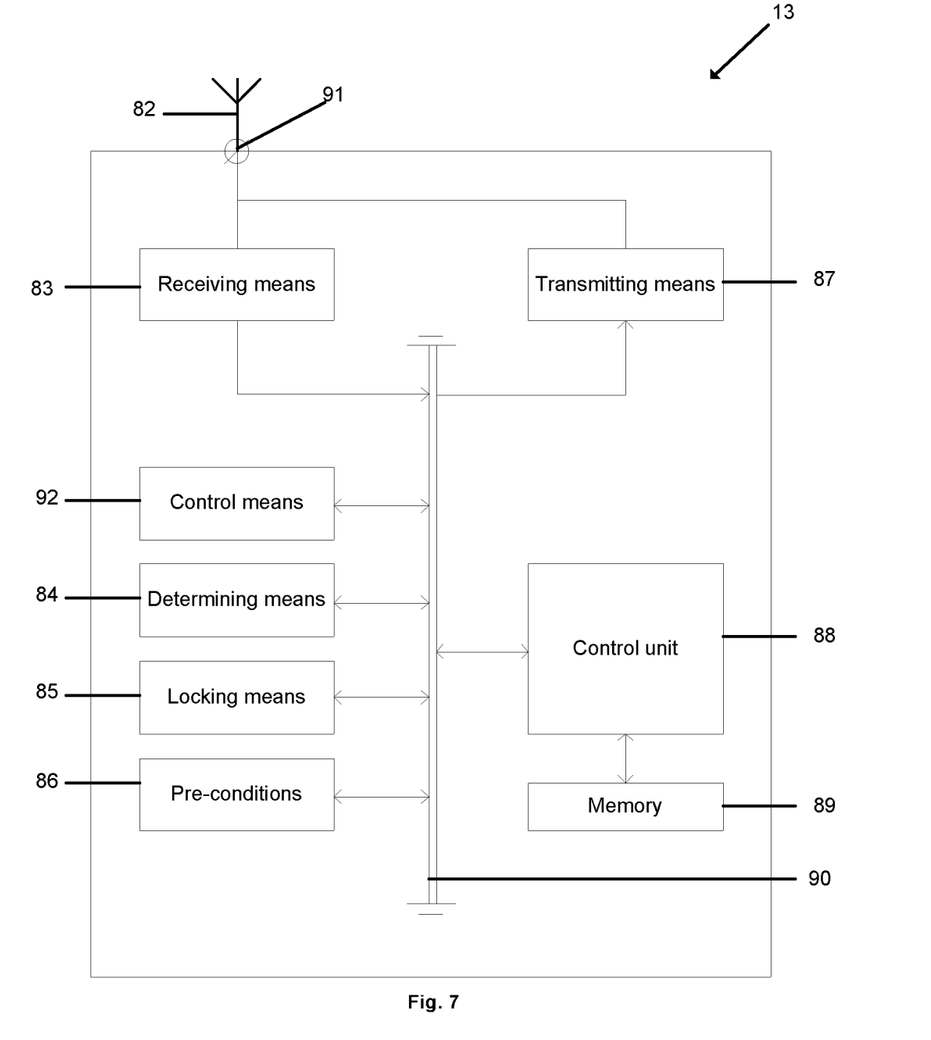
FIG. 7 shows an example of a central control unit according to the present invention.

FIG. 7 is an example of a central control unit 13 according to the present invention.

The central control unit 13 comprises receiving means 83, sent means 87, determining means 84, locking means 85, preconditions 86, control means 92 and a control unit 88, all operatively connected to each other via a bus 90.

The receiving means 83 are arranged for receiving, via antenna 82 and input/output terminal 91, of data representative of longitudinal guides from a read out identification means by a portable wireless reading device. The central control unit 13 further comprises a memory 89 for storing an identification of a portable wireless reading device for which longitudinal guides are being locked.

The locking means 85 are further arranged for, in combination with the processing unit, digitally locking of the longitudinal guides on the basis of the received data. The locking means 85 are further arranged to digitally release any of the locked longitudinal guides.

In the present example, preconditions 86 are present, wherein these preconditions 86 have to be met before longitudinal guides can be digitally released. The determining means 84 are arranged to make these preconditions, optionally in combination with aspects stored in the memory 89, known to the locking means 85.

The control means 92, in combination with the sending means 87, are arranged to control the autonomous carriages, on the basis of digitally locked and digitally released longitudinal guides. This will involve sending data wirelessly to the different autonomous carriages, for example data directed to routes that the autonomous carriages need to track.

The present invention is not limited to the examples as described above in connection with the different figures. To appreciate the scope of the invention, the following claims are relevant.

The invention claimed is:

1. A system for storing products, comprising:
    a number of racks extending parallel to each other, wherein each rack is provided with storage positions for products located next to and above each other;
    a guide system comprising longitudinal guides extending in aisles between adjacent racks, and horizontal transverse guides extending transversely to the longitudinal guides as well as junctions at positions where at least one longitudinal guide and at least one transverse guide connect;
    carriages capable of autonomously travelling over the longitudinal guides, transverse guides and junctions for placing products in and/or taking products out the storage positions;
    a central control unit arranged for digitally releasing and locking of longitudinal guides and for controlling the autonomous carriages solely over the released longitudinal guides,
    wherein the system further comprises:
    a number of vertically located work areas per aisle, wherein each work area comprises a number of height levels, wherein each height level includes horizontally disposed longitudinal guides and is associated with one horizontal layer of storage positions for the products located next to each other;
    identification means, near end phases of the racks, present at the work areas, for uniquely identifying the longitudinal guides of each work area;
    at least one portable wireless reading device in communication with the central control unit for reading out the identification means and for communicating read out identification means to the central control unit,
    wherein the central control unit is further arranged for digitally locking of longitudinal guides identified with an identification means, communicated by a portable wireless reading device.

2. The system for storing products according to claim 1, wherein the central control unit is further arranged for:
    digitally releasing of longitudinal guides identified with the identification means, communicated by the portable wireless reading device, at least under the condition that the central control unit had previously locked the longitudinal guides for the same portable wireless reading device.

3. The system for storing products according to claim 1, wherein the system comprises further identification means, close to end phases of the racks, present at the work areas, for uniquely identifying of longitudinal guides of each work area, wherein the central control unit is further arranged for:

digitally register whether an individual is present or not in a work area associated with longitudinal guides, wherein the longitudinal guides are identified with a further identification means, communicated by a further portable wireless reading device, and digitally releasing of the longitudinal guides identified with an identification means communicated by the portable wireless reading device at least under the condition that no presence of an individual is registered in the work area identified with the identification means.

4. The system for storing products according to claim 1, wherein the system further comprises:

closing devices, placed close to each work area, for physically closing and opening these work areas for individuals, wherein a closing device of a work area in open position the identification means associated with that work area for the at least one portable wireless reading device covers.

5. The system for storing products according to claim 3, wherein a closing device of a work area in closed position the further identification means of that work area for the at least one portable wireless reading device covers.

6. The system for storing products according to claim 1, wherein the identification means comprise at least one of: QR codes bar codes and RFID identification.

7. The system for storing products according to claim 1, wherein the central control unit is further arranged for digitally locking of longitudinal guides extending from longitudinal guides present in a work area identified with the communicated identification means.

8. A method for controlling autonomous carriages in a system for storing products, wherein the system comprises:

a number of racks extending parallel to each other, wherein each rack is provided with storage positions for products located next to and above each other;

a guide system comprising longitudinal guides extending in aisles between adjacent racks, and horizontal transverse guides extending transversely to the longitudinal guides as well as junctions at positions where at least one longitudinal guide and at least one transverse guide connect;

carriages capable of autonomously travelling over the longitudinal guides, transverse guides and junctions for placing products in and/or taking products out of the storage positions;

vertically located work areas per aisle, wherein each work area comprises a number of height levels, wherein each height level includes horizontally disposed longitudinal guides and is associated with one horizontal layer of storage positions for the products located next to each other;

identification means, near end phases of the racks, present at the work areas, for uniquely identifying the longitudinal guides of each work area;

at least one portable wireless reading device in communication with the central control unit for reading out the identification means and for communicating read out identification means to the central control unit, said method being characterized by the steps of:

receiving, by the central control unit, from a portable wireless reading device, data representative of longitudinal guides corresponding to a read out identification means by the portable wireless reading device;

digitally locking, by the central control unit, of the longitudinal guides based on the received data;

controlling the autonomous carriages solely over the released longitudinal guides.

9. The method according to claim 8, comprising the step of:

digitally releasing of locked longitudinal guides associated with an identification means communicated by a portable wireless reading device at least under the condition that the central control unit had previously locked the longitudinal guides for the same portable wireless reading device.

10. The method according to claim 8, wherein the system comprises further identification means, close to end phases of the racks, present at the work areas, for uniquely identifying of longitudinal guides of each work area, which method further comprises the steps of:

receiving, by the central control unit, from a portable wireless reading device, data representative for longitudinal guides associated with a read out further identification means by a further portable wireless reading device;

digitally registering the presence of individuals in the work area;

digitally releasing of locked longitudinal guides identified by an identification means communicated by a portable wireless reading device at least under the condition that no presence of an individual is registered in the work area identified with the identification means.

11. The method according to claim 8, characterized in, that the step of digitally locking, by the central control unit, of longitudinal guides based on the received date, comprises:

controlling, by the central control unit, of autonomous carriages out of the locked longitudinal guides.

12. The method according to claim 8, wherein the step of digitally locking, by the central control unit, of longitudinal guides based on the received data, comprises:

stopping, by the central control unit, the autonomous carriages on the locked longitudinal guides.

13. The central control unit arranged to be operative in a system according to claim 1, wherein the central control unit comprises:

receiving means arranged for receiving, from a portable wireless reading device, data representative for longitudinal guides from a read out identification means by a portable wireless reading device;

locking means arranged for digitally locking the longitudinal guides based on the received data;

control means arranged for controlling the autonomous carriages over released longitudinal guides.

14. The central control unit according to claim 13, wherein the central control unit further comprises:

a memory for storing an identification of a portable wireless reading device for which longitudinal guides are being locked;

wherein the locking means are arranged for digitally releasing the locked longitudinal guides when, in the memory, the same identification of the portable wireless reading device is stored related to the previous act of locking the longitudinal guides.

15. The central control unit according to claim 13, wherein the control means arranged for one of:

controlling, by the central control unit, of autonomous carriages from the locked longitudinal guides, and stopping, by the central control unit, of autonomous carriages on the locked longitudinal guides.

\* \* \* \* \*